INVENTOR.
R. Lee Hollingsworth

INVENTOR.
R LEE HOLLINGSWORTH
BY
Albert S. Jacobs
ATTORNEY

United States Patent Office 3,419,688
Patented Dec. 31, 1968

3,419,688
APPARATUS FOR RECORDING PERPENDICULAR MAGNETIC FIELDS IN TRANSVERSE TRACKS ON A MAGNETIC TAPE

R Lee Hollingsworth, 110 Fox Blvd., Massapequa, N.Y. 11758

Continuation-in-part of application Ser. No. 36,678, June 16, 1960. This application Dec. 4, 1964, Ser. No. 418,374
7 Claims. (Cl. 179—100.2)

ABSTRACT OF THE DISCLOSURE

An apparatus for magnetically recording transverse the length of a tape. A rotating magnetic distributor with a plurality of arms is arranged axially of a pair of opposed semi-circular magnetic members. A tape is driven between the rotating distributor arms and one of the semi-circular members in such a manner that perpendicular magnetic fields are recorded in transverse tracks on the tape.

The present invention relates to magnetic sound, video and computer translators and recording systems and is a continuation-in-part of my pending application Ser. No. 36,678 filed June 16, 1960 now Patent No. 3,236,942.

In the case of multi-track magnetic tape recording, it is necessary to have means for recording on, or reading off of, each intelligence bearing magnetic track areas individually, at high speed scanning rates, or at high speed transverse continuous area scanning during record and readout.

The present invention provides transducer head and magnetic distributor means having a magnetic material of highly permeable alloys or iron oxide, or magnetic material plating to better conduct high speed magnetic impulses to a concentrated magnetic translation point or area.

In the present invention, there is provided means to accomplish high speed transverse scanning of magnetic tape, said tape being accurately guided along a concentrated three part curvature conforming portion of a recording head means.

In accordance with the present invention, the recording of electrical signals comprising television signals and sound signals, and signals corresponding thereto at least in part, and recording and storing signals corresponding to various kinds of physical observations, including radar and transponder signals and business machine data, is accomplished.

The present invention provides means comprising at least a two-piece magnetic circuit recording head device in which the winding carrying piece is selectively magnetically energizable to the magnetic tape, wherein the tape may or may not be physically touched by the parts of the magnetic head means. This saves wear on the tape and on the high speed distributor means.

The present invention also provides a multiple channel recording head by the simple means of positioning a rotatable magnetic distributor at a predetermined position relative to a curved magnetic tape width to record on, or readout from the tape, intelligence from one, or from any one or more tracks simultaneously, or from one of one hundred or more longitudinal record read tracks, avoiding the use of multiple magnetic gaps and their necessary electric windings to each head, and the use of complicated multiple selector switches. The elimination of all of these electrical circuits, and electric switching means normally used in multi-track recorders, makes the present invention highly desirable, and an example of the dexterity of an information storage and retrieval system for computers and generally recorded intelligence is as follows: Assume a magnetic tape four inches wide is passed through at least a portion of a circular magnetic gap area, whereby a sharp pointed magnetic distributor makes magnetic contact with the magnetic tape to establish a magnetic loop circuit, either in high speed synchronous scansion rotation to provide transverse recording and readout, or where the magnetic distributor is stopped at a calibrated holding point to translate along any one of perhaps five hundred separate lines running lengthwise of the tape. Here the positioning of the distributor may be by an automatic selector means such as a dial phone mechanism, counter stepping mechanism, resistor and shaft positioning means, automatic harmonic impulse stepping means as used in channel selecting of one radio channel out of one thousand, or any other suitable precision shaft positioning means. By the time the shaft is positioned, the tape which does not have to be too long normally due to having four to five hundred channels, is by this time reeled up to the point of the stored information or to the point where information is to be stored. Therefore a rather simplified form of magnetic tape computer or reference library of information is provided, which, when connected to a printout or writeout means, provides the information almost immediately in final and usable form. If a longer tape be used, additional retrieval time may be required to reach a portion of the information. However, billions of bits of information can be stored and retrieved from one roll of such tape. If the distributor has at least two or more sharp pointed magnetic arms or magnetic gaps positioned so that when one is leaving the tape, another is starting to traverse the tape at the opposite side or position on the tape, whereby a radio frequency carrier may be recorded that has modulated thereon a great multiplicity of sideband information channels, each carrying a very large volume of information, then the tape need only be positioned longitudinally, and to the channel desired to be translated, that is, recording or readout is accomplished by being connected directly to a printout means through a separate detector and filtered amplifier channel. Such is not however, as simplified circuit-wise as the positioning of the rotating or positionable distributor means.

The rotating distributor means according to the present invention, may comprise a rotating magnetic gap means to make brushing contact transversely of the moving tape, guided by the previously mentioned tape guilding means, said multiple gap means being commonly fed with energy to be recorded and supplied through a set of slip ring contacts attached to the rotating shaft from stationary brushes. This statement, except for the combination of the rotating gap and the guiding and holding means, in itself is known in the art. But when the recording gaps are adjusted 90° so that the gap length—the distance between the poles of the gap—defines the width of the transverse line to be recorded—here then, is something new. That is, it is new to record the information in extremely narrow parallel transverse lines across the tape according to the length of the gap. A portion of each impulse along each line may be re-recorded, or recorded over. This system also confines the recording activity in lines the width of which is equal to the length of the gap without line overlap, thus making it possible to position the recorded transverse lines so close together, that each may contain a horizontal television picture line in a manner to provide a magnetic picture that can be transversely scanned without regard for line travel synchronization and tape skewing. If the magnetic distributor heretofore mentioned is brought to a very sharp point as it conducts the magnetic pulses to the tape, the magnetic packing density approaches that of photography. A gap may be positioned to record in longitudinal lines with the recording gap positioned for re-recording a portion of each supplied impulse. For readout, the gap would be rotated on its shaft mount or 90° the tape passed through a separate readout gap, however desirable echo effects may be obtained by using the same gap for readout that was used for recording.

In one embodiment of the invention a horseshoe magnet has a record-readout winding mounted thereon, and the ends of the poles are extended and shaped to form substantially a half, but divided circle areas, wherein provisions are made to pass a magnetic tape. An inserted groove in the tape guard and guide is provided to carry the leading edge of the tape to protect the edge from the magnetic distributor means that is mounted on a shaft in the center of the magnetic circle areas of the two magnetic poles when the tape is physically brushed. A resilient felt or rubber area is preferably provided within the curvatures of the magnetic tape guide and guard circle area, when the recording and readout action utilizes a magnetic translating head unit having a magnetic gap that brushes the tape in its transverse scanning action across the tape. To assist in keeping the tape or tapes in the recording curvature area and not within an edge protecting slot, there is preferably a first and third gap assembly section of nonmagnetic guiding curvature area located close to either side of the magnetic curvature areas and their supporting means, so that the tape is guided positively before and after passing through the magnetic curvature area, unlike other systems that use an air suction means to hold the tape in a curved area while it is scanned or brushed by rotating magnetic head gaps, or by magnetic distributors as herein described. The supporting means for both the head gaps and the sharp distributor points may extend to the ends of the gap or to the ends of the sharp points or sharp edges of the distributor so that, mechanically speaking, the tape is brushed with a smooth wheel that is nonmagnetic except for the recording head gaps or the magnetic distributor points or edges. It is to be understood that the intensity of the magnetic energy may be increased to provide magnetic etching according to my pending patent application Ser. No. 145,805 filed Oct. 18, 1961, or that electricity be applied to the distributor and to the curvature areas to produce recording or printing on a tape having a surface sensitive to an electric arc or to the flow of electricity through or along the surface of the tape. The magnetic distributor may comprise a multiplicity of arms and the magnetic curvature areas may be somewhat increased in circumference so that when one television horizontal line is recorded on one transverse recorded line across the tape, the rotating speed of the distributor is not increased over speeds used in the prior art, and this speed may even be decreased. To fully distinguish from the prior art one must take into consideration the total head, distributing means and the total overall result.

The prime purpose of the present invention is to provide a new and novel magnetic recording system.

Another purpose of the invention is to provide a new and novel tape guiding means for tape as used in magnetic recording machines, computers and in facsimile transmission and reception and for making printing and duplicating stencils, printing plates by magnetic etching by magnetic removal recording according to the aforesaid pending patent application, or by punching holes in the tape by the same magnetic removal technique when the tape has a great plurality of holes therethrough and which are filled with a magnetic composition that can be selectively removed according to modulations or by prepared and timed impulses, or selectively punched out by applied magnetic impulses.

The invention will now be briefly explained with reference to the accompanying drawings. The elements of the drawings are identified by the same numerals as were used in the pending patent application of which this is a continuation in part application.

Figure 2:
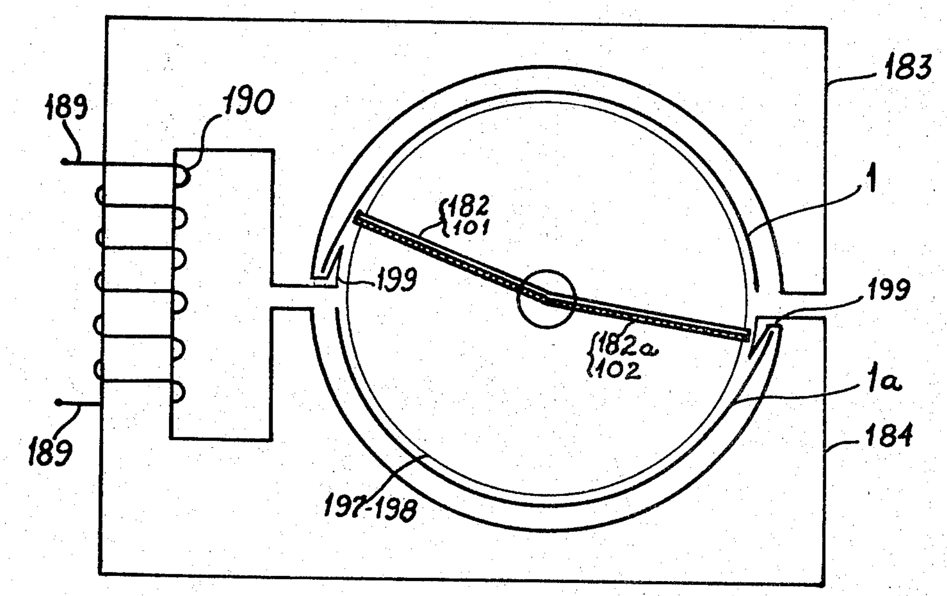
FIGURE 2 is a side view of the stationary horseshoe magnetic area that forms the center portion of FIGURE 1. This figure shows an end view of a rotatable shaft on which are mounted the magnetic distributor arms that selectively connect magnetic energy through the tape to selectively magnetize the tape.
Figure 3:
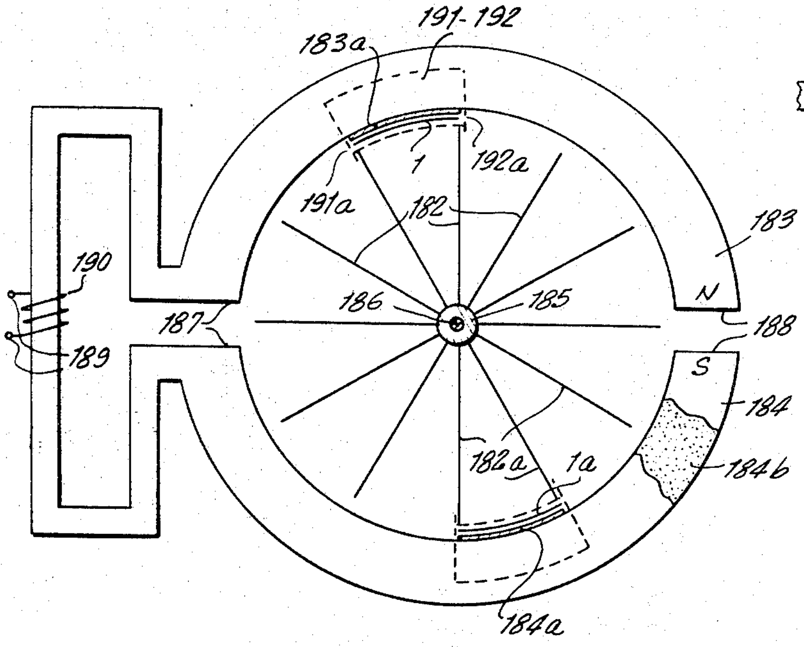

FIGURE 3 shows an embodiment of FIGURE 2 which can accommodate up to one hundred and five distributor arms which by five shaft revolutions provides recording for one fully scanned 525 line picture frame, each horizontal picture frame line being recorded across preferably a one-quarter inch tape. At thirty frames per second, a speed of 9000 r.p.m. is required to record each transverse line across the tape, making a series of magnetic pictures on the tape that can be magnetically scanned for readout or for re-transmission as in television tape transmission, and in transferring magnetic energy to an electrostatic cathode ray printout, developer and dryer. These magnetic pictures may be passed through colored magnetic powder in suspension, dry or liquid, and after collecting magnetic powder within a given time period as a controlled application of the powder, the tape or sheet is treated with a fixer and utilized.

Figure 4:
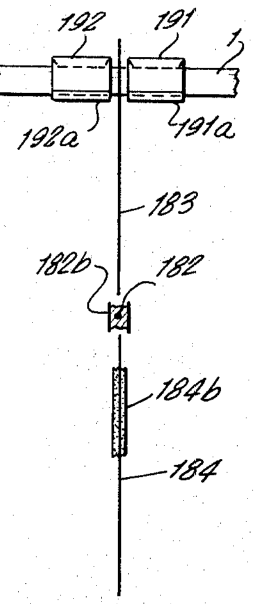

FIGURE 4 is a side view of FIGURE 3.

Figure 5:
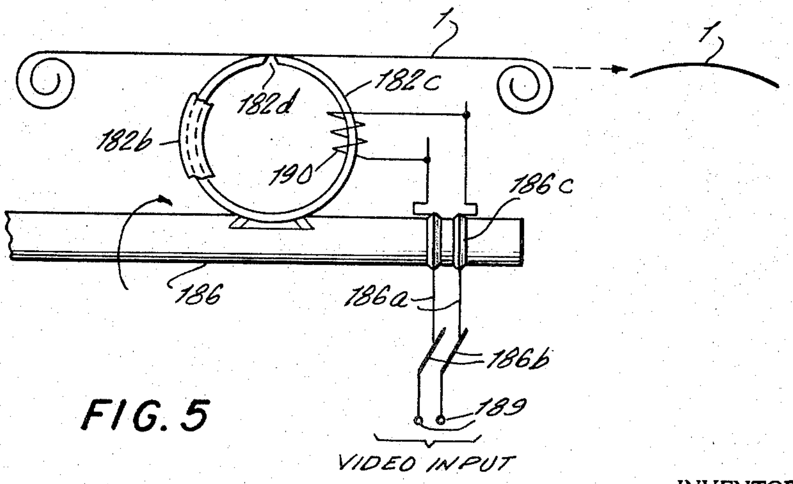

FIGURE 5 shows an embodiment of the invention wherein the magnetic recording gap is positioned to scan the tape, with the gap moving sideways across the tape to confine the width of the transverse lines to the length of the recording gap. This figure is also representative of a distributor means having a length such that it may provide a recording-over effect between the impulses to be recorded one after the other along each transverse line.

I will now describe my invention in detail.

Figure 1:
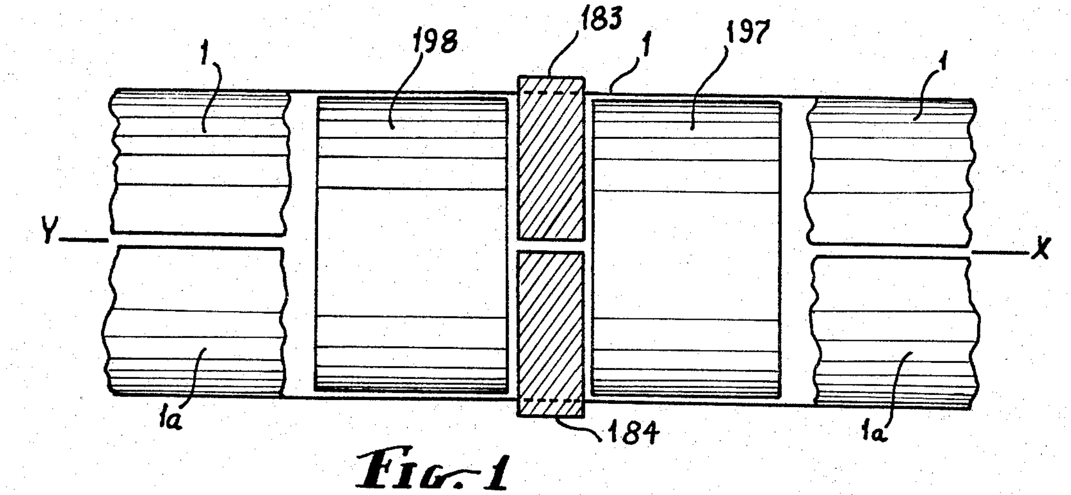
FIGURE 1 shows a guideway for the passage of at least one magnetic tape held in a curvature during its passage via a stationary magnetic recording area.

FIGURE 1 illustrates apparatus and structural means for guiding a recording tape of any type, and particularly a magnetic recording tape through a curved surface area where the tape is scanned by a recording gap attached to a shaft, or by a magnetic distributor according to the present invention. The edge of the tape is protected from being torn by the scanning mechanisms as illustrated by FIGURES 1, 2 and 3. Recording tapes 1 and/or 1*a* are shown curved and fitted in the upper and lower portions of magnetic gap areas 183 and 184, which are magnetically scanned by eccentric gap distributor means 182 and 182*a*, or the tape is brushed by a recording gap of a rotating head of the prior art, not here illustrated, or by a recording head according to FIGURE 5 hereof. The tapes 1 and 1*a* are threaded over circular guide 197, through the magnetic curvature areas 183 and 184 and continues over circular guide 198. Guides 197 and 198 are precision made and are mounted to exactly guide tapes 1 and 1*a* precisely along the magnetic circle areas 183 and 184. Circular guides 197 and 198 may be slidably adjusted along the direction of the shaft or supporting means not shown, to facilitate tape threading. They may also be divided and hinged to facilitate placing the tape in the magnetic curvature area for record or readout. The movement of tapes 1 and 1*a* are from a tape reeling means, through the guide means past the scanning magnetic distributor means or of a scanning magnetic gap means; via a capstan and onto a tape takeup reeling means. In one side of the magnetic pole face areas 183 and 184 of the tape guiding means, is shown a tape edge protecting groove 199. This protection for the tape edge may only be provided in the guiding means either side of the magnetic recording curvature areas 183 and 184. This allows the tape to be held very closely and firmly in the curvature by guideways closely positioned either side of the curved magnetic pole areas 183 and 184. If the magnetic areas 183 and 184 contain the groove to protect the edge of the tape, the ends of the distributor means 182 and 182*a* do not translate across the entire width of the tape, however if the guideway or guiding means 183 and 184 are located very closely to the magnetic curved areas on either side of the magnetic curvature area, then the distributor or any rotating recording gap means may safely brush the tape across its full width without inflicting mechanical injury to the leading edge of the tape. In operation, signal energy to be recorded is connected to terminals 189 and flows through coil 190, which is wound upon the magnetic material loop that is extended to form magnetic areas 183 and 184. As magnetic distributor arms 182 and 182*a* rotate with the shaft located in the center of the magnetic circle formed in magnetic areas 183 and 184, recording, or readout is accomplished on or from tape 1 and 1*a*. During readout the magnetic impulses from the tape are selectively sensed and their magnetic lines of force are transferred from the tape to flow within the magnetic loop formed by the horseshoe magnets 183 and 184 and the rotating distributor arms 182 and 182*a*, to induce electric energy into coil 190 and appears across terminals 189, which is normally connected to a video amplifier and reproducer system. During reproduction, only one of the tapes is run through the machine as it would be rather difficult and possibly impractical to pull both tapes at exactly the same speed as during recording, since from ten to twenty horizontal lines of a television picture signal is recorded on one or both tapes each time an arm 182 passes transversely over one or both of the tapes. In another mode of operation, as 182 is passing off of tape 1, counterclockwise as an example, an arm 182*a* has already started a separate transverse line. The exaggerated angle of displacement of distributor arms 182 and 182*a* is of no consequence in this instance, and they may be mounted exactly opposite or 180° apart. When one sweep of an arm 182 across the tape represents one horizontal line of a television picture, then arms 182 and 182*a* may be offset the exact amount to produce a form of halftone pattern by slightly displacing each succeeding line lenthwise across the tape a small amount from each other. When the outer ends of distributor arms 182 and 182*a* are brought to a sharp point, the magnetic impulses flowing into magnetic areas 183 and 184 are concentrated directly to the tapes in extremely narrow lines which can be as close together as a fraction of a mil, however there is a practical limit to both the narrowness of each transverse line and their adjacent separation space, plus the ability of the distributor to retract each transverse line during readout. At present, five mil width of each transverse line with five mil separation is a fair compromise as to line width and line separation, however precision mechanical improvements promise to reduce both the line width and spacing.

The angle of travel of the transverse recording lines is indicated as being almost at right angles to the tape length, however the circular areas 183 and 184 may be made to receive the tape at an angle such that, on a one inch wide tape, each transverse line may be somewhat longer than one inch, however the lines are straight so that the packing density does not change as the lines are recorded.

In FIGURES 3 and 4, the invention provides for up to one hundred five magnetic distributor arms, which by five shaft revolutions provides one fully scanned 525-line framed picture, each horizontal picture line being recorded across preferably a one-quarter inch wide tape. At thirty frames per second, a speed of 9000 r.p.m. for the distributor shaft is required to record each transverse line across the tape, making a series of magnetic pictures on the tape that can be magnetically scanned for readout or for transmitting over a television station again and again. These magnetic pictures may be subjected to dispersed magnetic powder in air, even under compression, or in a liquid solution, to produce viewable pictures by the settling of the powder on the magnetic tape having the magnetic picture recorded thereon. If the recording takes the form of magnetic removal, that is, lifting elemental parts of the iron oxide from the tape according to picture modulations, then the pictures are viewable direct and by projection enlargement, and becomes an excellent substitute for micro-film instantly without chemical or heat treatment of any kind.

In FIGURE 3 the energy to be recorded is also supplied to terminals 189 and flows through coil 190 to produce opposite magnetic polarities between flat magnetic areas 183 and 184. The separation distances 187 and 188 between 183 and 184 are sufficient that no magnetic losses occur between 183 and 184. Distributor arms here represented by 182 and 182*a* comprise a total of up to one hundred five arms attached to and extended from magnetic hub member 185, which is attached to preferably non-magnetic shaft 186. Guiding member 191 and 192 are positioned each side of magnetic areas 183 and 184 as illustrated in FIGURE 4, and by the dotted line areas 191 and 192 in FIGURE 3. Here tape 1, and 1*a* if used simultaneously, are moved through guide means 191 and 192. During the passage they are held in position by extension guides 191*a* and 192*a*, which are positioned adjacent to 183 and 184 at the circle areas at raised areas 183*a* and 184*a* to guide the tapes directly over these raised areas, so that the ends of magnetic distributors 182 and 182*a* are active only when passing over the tapes to complete the magnetic loop through the tapes, and as each of the up to one hundred five distributor arm pass over the tape. It is to be noted that recording continuity is provided by an overlap between the succeeding distributor arms, that is, as one has traversed the tape width and as it is about to leave the tape, the next succeeding distributor point is starting its excursion across the tape to provide recording continuity. In this manner then, continuity is maintained between the adjacent lines. However, this continuity between the transverse lines as here described, is not required if each transverse line records one horizontal television picture line. With continued improvement in video tape as to magnetic oxide grain sizes and uniform distribution on the tape, it appears that it may soon be possible to record as much as from five to ten horizontal television picture lines within one transverse line across a one-quarter inch wide tape.

FIGURE 4 shows an edge view of FIGURE 3 looking into the separation distance 188 between the ends of magnetic areas 183 and 184. Tape 1 is shown curved in the set-a-part portion of the drawing, as it passes through guide means 191 and 192, and extended guide lips or extensions 191*a* and 192*a*. Here distributors 182 and 182*a* are held rigid by a formed means 182*b* shown in cut-a-way, 183 and 184 being preferably very thin to accommodate the travel of rapidly changing and occurring magnetic energy. Also shown supported by a non-magnetic means 184*b* which may comprise bonded ceramic or aluminum plates fitted to the sides of 183 and 184 to lend it supporting strength and provide magnetic insulation for magnetic areas 183 and 184. This means of support may take various forms. The thickness of magnetic areas 183 and 184 may be very thin, even a few microns in thickness and the distributor contact width may be sharp edged and considerably broader—even one mil—to overcome transverse line tracking eccentricities during record, and during readout particularly. Magnetic areas 184*a* are raised above the circular area, and adjustable if desired, to make very close magnetic contact with the sharp points or sharp edged shapes of magnetic distributors 182 and 182*b*, not leaving room for the passage of tape 1*a*, to increase the efficiency of magnetic transfer through tape 1 from magnetic area 183 and 184 according to the electrical wave energy applied to input contacts 189. In FIGURE 3, it is to be appreciated that more than one tape may be recorded simultaneously by providing more pairs of magnetic raised sections 184*a* and tape passage guiding means 191 and 192 for any additional raised sections. If only one or two tapes are desired to be recorded at the same time, the circular magnetic areas 183 and 184 need only extend to accommodate two raised magnetic members 184*a* opposite of each other. It is to be further appreciated, that two or more tapes may also be placed in the same slot and the magnetic energy passed directly through the several thicknesses of tape to provide exact multiple recordings. These sharp pointed magnetic arms may indeed be scalloped out of a circular magnetic disc which would be capable of supporting itself without supporting means 182*b* being attached or applied thereto, the disk being magnetically insulated from the shaft 186.

FIGURE 5 illustrates another embodiment of the invention wherein a tape 1 is supplied from a reeling or transport means indicated by the wound tapes, of sufficient accuracy in tape transport, and the tape is held in a curvature preferably according to FIGURES 1 and 3, including the desired tape guiding means. A rotatable shaft 186 is positioned at the center of the curvature of the tape. Slip rings 186*a* are placed on shaft 186 and are electrically insulated from the shaft by insulating bushings 186*c*. Coil 190 that is wound on recording head 182*c* receives electric energy that is applied to video input terminals 189, via brushes 186*b* whih are in electrical brushing contact with slip ring contacts 186*a*. Magnetic recording head 182*c* is attached to shaft 186 in a suitable removable and adjustable manner, of which there are numerous ways of attachment of this head to the shaft. The recording head gap 182*d* is so positioned by the size of the recording head that it makes accurate pressure contact (preferably) on the magnetic surface of the recording tape 1. Also where the brushing gap is utilized with the curvature guiding means according to the present invention, the circular area may be lined with resilient material to allow fluid-like pressure effects between the recording gap and the tape. It is to be noted that the recording gap moves sideways across the tape, and the width of each transverse line is defined by and confined in width to the length of the magnetic gap 182*d*. The magnetic material of the recording head 182*c* may be relatively thin and mechanically weak, therefore the head may be suitably supported by an applied ceramic, or other, supporting means 182*b*. In practice there would be a plurality of these recording heads positioned around shaft 186 so that as one is completing a transverse recording line, another head has instantly begun recording the next transverse line, thus continuity of recording is provided. The wear of the head gap and of the distributor points of FIGURES 2 and 3 due to contact with the tape is minimized and governed by the wear of the ceramics. Let us assume that recording gap 182*d* is one sixteenth inch wide and that the length of the gap is one mil in length, or the distance between the poles of the magnet. As the head rotates it will record transversely in lines across the tape one mil broad upon the tape. This gap can be very short in length, even infinitely short if excited in opposite phase relation to produce opposed poles to cause the magnetic wave energy to be strongly projected through the tape, as set forth in my patent application 841,822, filed Sept. 23, 1959, now bearing Ser. No. 179,281. In high speed impulse rate recording, a first pulse or character is recorded. Before the gap moves off of this recorded signal element, the next impulse is at least in part recorded over a portion of the previously recorded impulse. Here the efficiency of recording is somewhat increased as each re-recorded bit of space is translated at the instant, as if the entire tape had been premagnetized. This degree of increased efficiency varies of course with the strength of each previously recorded impulse and the length of both impulses. This re-recording, or recording over technique, came about in searching for a way to more accurately define the widths of closely spaced transversely recorded lines, and the recording efficiency was found to be inherent with this sideways movement of the recording gap or recording head. The gap width, not the gap length, may be reduced to as little as .00001 inch. The line width would still be accurately defined and the re-recording effect would not be present to any degree with this sideways movement of the recording head. This gives a longer wavelength to the gap, and adds emphasis to the recording of the lower video frequencies. Such a gap may be as long as five mils as it would record a line five mils wide. This type of recording head may be used in longitudinal recording for either single or multiple track recording and in reproduction. Head 182*c* of FIGURE 5 may be rotated 90 degrees on its shaft mount, back to a conventional position for recording or for playback. A calibrated dial and holding means not shown may be placed on the end of shaft 186 and be used for selecting longitudinal line positions on the tape, and such selection may be accomplished according to one of many types of automatic dial or shaft positioning devices, or by hand. A recording machine having a relatively broad tape with means for automatically positioning the tape to a desired point of translation on the tape, and means to position recording head 182*c* of FIGURE 5 to a given longitudinal line position along the tape, such machine provides a massive information magnetic storage and readout means.

In carrying the invention into practice in various ways to serve different commercial, educational, and entertainment uses, all known means of electronic amplification, modulating and de-modulating systems, limiting, signal expander means, signal multiplication devices, electric delay lines and delated action amplfiers for superimposing one picture frame over the other to double the picture lines, and all signal treatments known to the electronic and communications art and sciences are contemplated when desired or required in carrying the invention into practice, when used in combination with the invention as basically described and set forth herein.

It is to be appreciated, that when the transverse lines for a series of magnetic pictures corresponding to each television picture frame are recorded, the information may then be readout by passing the tape over the cathode ray magnetic sensing means which provides a large number of magnetic sensing wires sealed in a fine line across the face or flattened end of a cathode ray tube whereby the magnetic impules on the tape are physically connected into the tube to produce variations of the high speed scanning cathode ray beam, and these variations are sensed and connected to a visual reproducing means, thus providing high speed all electronic readout of the pictures or magnetic information stored on the tape. It is to be also appreciated that when energy is picked up from a magnetic recording, especially by a cathode ray tube magnetic scanning means, this energy may be controlled by the same scanning energy and used to apply enlarged electrostatic charges to an electrostatic paper via an electrostatic cathode ray tube recording and electrostatic image reproducing means, thus providing a combination to printout from a magnetic tape with no mechanical motion except the tape movement, in continuous fashion, or by frame sequence movement as in a motion picture film when being exposed and projected.

It is to be especially appreciated that when the transverse scanning provides a magnetic picture by magnetic recording on magnetic tape, and when the use is for filing of records, the visual reproduction by association with magnetic powder to render the picture viewable, need only be accomplished if and when the record is required, since proof of recording would be viewed or observed instantly after recording on a television monitor.

Other and further embodiments and use of the instant invention will be appreciated by those skilled in art by virtue of both this specification and the appended claims. The foregoing embodiments are illustrative and not limitative of my invention.

What is claimed is:

1. A magnetic tape recording system comprising flat semi-circular magnetic areas arranged to form a loop with diametrically opposite gaps sized to prevent magnetic losses, the magnetic areas at one gap extending beyond the loop to form a support connecting the magnetic areas, a coil encircling a portion of said support to provide energy to be recorded from terminals serving as input contacts to which electrical energy is supplied, thereby producing opposite magnetic polarities between said magnetic areas, a non-magnetic shaft mounted for rotation axially of said loop, a magnetic hub member on said shaft, a plurality of magnetic distributor arms extending radially from said shaft in angularly equi-spaced relationship and scanning said semi-circular magnetic areas during rotation, at least one tape movable between one of said semi-circular areas and said distributor arms and guided by guiding means disposed within and close to the inner edge surface of the semi-circular magnetic area, the tape being guided over a raised magnetic area of said semi-circular magnetic area so that the ends of the distributor arms are active only when passing over said tape.

2. A system according to claim 1 in which there are two tapes and an equal number of raised magnetic areas in diametrically opposite positions.

3. A system according to claim 1 in which the semi-circular magnetic areas are provided with non-magnetic protection.

4. A system according to claim 1 in which the arrangement is such that recording continuity is provided by overlap between successive distributor arms whereby as one such arm traverses the tape width and as it is about to leave the tape the next succeeding distributor arm starts across the tape, to maintain continuity between adjacent lines.

5. A system according to claim 1 in which the distributor arms are formed into a supporting non-magnetic wheel.

6. A magnetic tape recording system comprising flat semi-circular magnetic areas arranged to face each other and form a magnetic loop and diametrically opposite gap areas, an exciting coil encircling a portion of said loop to provide energy to be recorded from terminals serving as input contacts to which electrical energy is supplied, thereby producing opposing magnetic polarities between said magnetic areas, a non-magnetic shaft mounted for rotation axially of said gap areas, a magnetic hub member on said shaft, a plurality of magnetic distributor arms extending radially from said shaft in angularly spaced relationship and scanning said semi-circular magnetic areas during rotation, at least one tape movable between one of the magnetic circular area, semi-circular areas and said distributor arms and guided by guiding means disposed adjacent to the semi-circular magnetic areas, the tape being guided over a raised magnetic area of said semi-circular magnetic areas so that the ends of the distributor arms are active only when passing over said tape.

7. A magnetic tape recording system comprising flat semi-circular magnetic areas arranged to face each other and extended to form a magnetic loop and diametrically opposite surface gap areas, an exciting coil encircling a portion of said loop to provide energy to be recorded from terminals serving as input contacts to which electrical energy is supplied, thereby producing opposing magnetic polarities between said magnetic areas, a non-magnetic shaft mounted for rotation axially of said gap surface area, a magnetic hub member on said shaft, a plurality of magnetic distributor arms extending radially from said shaft in angularly spaced relationship and scanning said semi-circular magnetic areas during rotation, at least one tape movable between one of the semi-circular magnetic areas and said distributor arms, and guided by guiding means disposed adjacent to the semi-circular magnetic areas.

References Cited

UNITED STATES PATENTS

| | | | |
|---|---|---|---|
| 2,743,318 | 4/1956 | De Forest | 179—100.2 |
| 2,965,708 | 12/1960 | Witt | 179—100.2 |
| 2,575,742 | 11/1951 | Baltin et al. | 346—74 |
| 3,099,709 | 7/1963 | Barry | 179—100.2 |

BERNARD KONICK, *Primary Examiner.*

J. R. GOUDEAU, *Assistant Examiner.*

U.S. Cl. X.R.

178—6.6; 346—74